United States Patent

[11] 3,630,695

| [72] | Inventors | Irl N. Duling;<br>Richard D. Cassar, both of West Chester, Pa. |
|---|---|---|
| [21] | Appl. No. | 840,530 |
| [22] | Filed | July 9, 1969 |
| [45] | Patented | Dec. 28, 1971 |
| [73] | Assignee | Sun Oil Company<br>Philadelphia, Pa. |

[54] FUEL COMPOSITION
2 Claims, No Drawings

| [52] | U.S. Cl. | 44/1 R, 44/6, 44/41 |
|---|---|---|
| [51] | Int. Cl. | C10l 9/00 |
| [50] | Field of Search | 44/1, 6, 16, 24, 21, 25, 26, 41, 7; 126/59.5 |

[56] References Cited
UNITED STATES PATENTS

| 2,831,330 | 4/1958 | Walker | 44/7.5 X |
| 3,091,952 | 6/1963 | Black | 44/7.5 X |
| 3,232,720 | 2/1966 | Kepple | 44/6 X |
| 3,327,505 | 6/1967 | Brown | 431/288 |

Primary Examiner—Daniel E. Wyman
Assistant Examiner—C. F. Dees
Attorneys—George L. Church, Donald R. Johnson and Wilmer E. McCorquodale, Jr.

ABSTRACT: A solid fuel composition comprising paraffin wax having 1.1 to 25 weight percent of polyethylene with a molecular weight in the range of 500,000 to 6,000,000 uniformly distributed therein, is useful for supplying heat to protect living plants susceptible to injury by low ambient air temperature. This composition is self-supporting, burns without smoke, and burns completely leaving little or no residue. In addition a large mass of this composition ignites easily.

FUEL COMPOSITION

CROSS-REFERENCE TO RELATED APPLICATION

This invention is related to that described and claimed in Cassar application Ser. No. 840,532, filed the same date as this application, which constitutes an improvement in the solid fuel composition disclosed in this application.

BACKGROUND OF THE INVENTION

This invention relates to a solid fuel formulation which when shaped into large blocks is self-supporting, that is, the block does not require a supporting container to withstand the weathering effect of rain and sun in the field. In addition it is easily ignited by the simplest of ignition methods. Furthermore it burns without smoke. The invention also embraces the method of protecting living plants from low temperatures by burning the solid material defined herein and the solid body capable of sustaining combustion having the composition defined herein. The solid fuel composition comprises paraffin wax and 1.1 to 25 weight percent ultra high molecular weight polyethylene. The latter, with a molecular weight in the range of 500,000 to 6,000,000 is also referred to herein for convenience as "UHMW PE."

Protection of living plants against freezing temperatures and resultant frost damage is of paramount importance to fruit growers, vegetable farmers, and ornamental nurserymen. Freezing temperatures can occur at any time depending upon the area as a result of a generalized cold snap or of localized conditions where cold and warm air layers stratify. Frost damage to fruit trees can destroy the trees, blooms or maturing fruit. Likewise, vegetable crops can be destroyed at any time as well as ornamental flowers, shrubs and trees.

Various means have been used to combat frost damage when falling temperatures threaten. The most widespread method has been to burn solid and liquid combustible materials in the locus of the living plants to warm the ambient air. It is well known that incomplete combustion of such materials can cause plant damage as well as create serious air pollution problems and road hazards by the smoke produced. For example, S. G. Belak, R. H. Campbell, W. R. Cherry and A. J. Bozzelli U.S. Pat. No. 3,362,800, dated Jan. 9, 1968, describes a solid bituminous fuel composition which, although readily combustible when ignited with a gasoline torch, produces some black smoke. In addition the high cost of solid fuel units has prevented the commercialization of many of the fuel compositions already patented. A major factor contributing to this high cost is the cost of the container. For example a cost analysis of the solid fuel unit described in U.S. Pat. No. 3,327,505, J. S. Brown, dated June 27, 1967, indicates that the cost of the polyolefin-coated paper container exceeds the cost of the wax fuel but yet very little heat is obtained from the paper container. Liquid fuels require a substantial capital investment in mechanical burners, storage and delivery equipment that is costly to maintain and operate.

Another problem can arise where the solid fuel is in a cardboard container. In many areas such fuel units are stored unprotected in open fields thereby being exposed to rain and sun. If the protective covering of the cardboard is damaged moisture enters into the cardboard and quickly reduces the effectiveness of the cardboard container.

Consequently a containerless solid fuel that burns without smoke, is easily handled and can be stored in the field ready for use is desired to replace solid materials such as smoky bituminous fuels and the costly liquid fuels such as furnace oils.

SUMMARY OF THE INVENTION

The present invention is a solid fuel formulation of paraffin wax and UHMW PE. The addition and uniform distribution therein of an amount of polyethylene of weight average molecular weight in the range of 500,000 to 6,000,000 constituting between 1.1 and 25 weight present of the composition substantially alters the combustion and deformation characteristics of the wax whereby distinct advantages are obtained.

DESCRIPTION

Paraffin waxes are available with a wide range of physical properties, for example, melting points may be as low as 100° F. (AMP) or as high as 160° F. (AMP). These waxes can be used in this invention. Waxes which are commercially available and would be more generally used are those having a melting point between 127° F. (AMP) and 156° F. (AMP). Other physical properties of these latter waxes are: penetration at 77° F. of from 9 to 33 (ASTM D-1321), SUS viscosity at 210° F. of from 37.2 to 44.8 (ASTM D-446), oil content from 0.2 to 3.0 (ASTM D-721). AMP refers to the American Melting Point which is an arbitrary figure 3° F. higher than the ASTM melting point.

Polyethylenes are available with a wide range of molecular weights. These molecular weights have a substantial effect on the properties of the polyethylene. For example a polyethylene with a molecular weight of 1,500 is a waxy solid while a polyethylene with a molecular weight of 1,500,000 is a hard, extremely tough solid. As discussed herein molecular weight refers to weight average molecular weight determined by light scattering or solution viscosity or melt viscosity.

In the synthesis of polyethylene, not all the molecules grow to the same size. The actual size variation depends upon the polymerization employed. Consequently, while the molecular weight of the UHMW PE referred to in the examples herein is stated as being 1,500,000, there are in fact individual molecules in the UHMW PE with molecular weights lower than 1,500,000 and even lower than 1,000,000. Sometimes, the individual molecules have molecular weights as low as 500,000. Also in the same 1,500,000 weight average molecular weight polyethylene there are in fact individual molecules with molecular weights greater than 2,000,000, sometime the individual molecules have molecular weights as high as 3,000,000 or even as high as 6,000,000. Thus the polyethylene used in this invention can have a weight average molecular weight in the range of 500,000 to 6,000,000.

Surprisingly the addition of UHMW PE to the paraffin wax permits the manufacture of a large containerless fuel unit that can be easily ignited despite its large size. In addition this fuel unit burns without smoke thereby avoiding any pollution problem. Also, after the flame has naturally gone out little residue remains. Furthermore, if the flame is extinguished before all the unit is consumed the unit ignites easily a second or third time, etc.

By a solid fuel unit being easily ignited it is meant that one safety match, in a windless environment, will ignite the fuel unit. This ease of ignition is critical when thousands of fuel units, distributed over hundreds of acres, have to be ignited in a very short time.

The unexpected benefits of the present invention are dependent on the amount of UHMW PE used in admixture with the wax. It has been discovered that if only 1.0 weight percent of UHMW PE is admixed with the paraffin wax the fuel unit cannot be ignited by a safety match. On the other hand if 2.5 weight percent of UHMW PE is admixed with paraffin wax the fuel unit can be easily ignited with a safety match. However, as the percent of UHMW PE admixed with the paraffin wax is increased the ignition characteristics of the combination approaches that of only UHMW PE, which cannot be ignited with a match. Therefore it is desirable that the amount of UHMW PE admix with the wax be more than 1.0 weight percent but be less than 50 weight percent and it is distinctly preferable that the amount of UHMW PE admix with the wax be from 1.1 to 25 weight percent.

The relative volatilities and viscosities of wax and UHMW PE may help explain why paraffin wax containing 2.5 weight percent of UHMW PE ignites whereas paraffin wax containing 1.0 weight percent of UHMW PE does not ignite. When an attempt is made to ignite the body of paraffin wax with a match, the melted wax, because it is not very viscous, flows rapidly away from the flame. Because the melted wax flows away so fast, not enough wax vaporizes to start a flame and without sufficient vaporization no flame is obtained. Apparently 1.0 weight percent UHMW PE in the paraffin wax does not significantly alter the phenomenon just described. However, 2.5 weight percent UHMW PE does alter the just described phenomenon. In other words, when an attempt is made to ignite a body comprising wax and 2.5 weight percent UHMW PE with a match, the melted hydrocarbon, that is the blend of UHMW PE and wax is very viscous and thus flows away slowly from the flame. Because the melted hydrocarbon flows so slowly enough wax is vaporized by the match flame to start and maintain a hydrocarbon consuming flame. Once the flame is sustained by vaporizing wax molecules the UHMW PE vaporizes or decomposed portions of UHMW PE vaporizes and contributes to the flame and it too is consumed.

In order that the heretoforementioned viscosity-volatility interplay exist during combustion the UHMW PE must be uniformly distributed throughout the wax. One way of achieving this uniform distribution is to add the UHMW PE as a powder to agitated molten wax, maintained at a temperature below the melting point of the UHMW PE an then allow the combination to solidify while being agitated. A preferred way of achieving this uniform distribution of UHMW PE in the wax is as follows. UHMW PE powder is added rapidly to the agitated molten wax maintained at a temperature above the melting point of the UHMW PE and the latter becomes uniformly distributed therein probably in a state of molecular dispersion. As soon as the polyethylene gels the wax, the homogeneous mass is allowed to cool without agitation. In the solid mass the polyethylene molecules are apparently uniformly distributed throughout the wax and by having a sufficient number of molecules present the molecules are apparently connected together in a random fashion. This molecular connection occurs with 2.5 weight percent of polyethylene and 97.5 weight percent wax but will not occur with a 1.0 weight percent of polyethylene and 99.0 weight percent wax. The connecting together of the UHMW PE molecules results in a sort of molecular polyethylene sponge in which the voids are filled with wax.

The preparation of a wax-UHMW PE fuel unit using the formulation defined herein can be by any of the means known to the art. The unit can be formed by casting or compression molding as well as by other available means.

EXAMPLES

A typical paraffin wax, used herein for illustrative purposes, has a melting point of 127° F. (AMP), a viscosity at 210° F. of 43.6 SUS, a penetration at 77° F. of 33 (ASTM D-1321) and an oil content of 0.5 percent (ASTM D-721). A typical UHMW PE, used herein for illustrative purposes has a weight average molecular weight of 1,500,000; a specific gravity of 0.94 (ASTM D-792), a crystalline melt point of 275° F. as determined by differential thermal analysis and a nil melt index (ASTM D-1238).

The compounding of the paraffin wax and UHMW PE was performed in the following manner. 3.325 pounds of paraffin wax was melted in a suitable container. The temperature of the molten wax was maintained at a few degrees above the melting point of the UHMW PE. While the molten wax was being agitated, 0.175 pound of UHMW PE powder was rapidly added. Soon thereafter the polyethylene gels the wax. After this gelation the combination, without agitation, was allowed to solidify into a 3.5-pound cylindrical body. This cylinder was about 5 inches in diameter and about 3.5 inches high. Other cylinders were prepared in the same fashion with different paraffin wax-UHMW PE weight ratios.

For comparative purposes, 3.5-pound cylinders were made of (1) only the heretoforementioned wax; (2) the heretoforementioned wax and 5 weight percent of a polyethylene with a molecular weight of 100,000; (3) a microcrystalline wax with a melting point of 151° F. (ASTM D-127) and 5 weight percent of the heretoforementioned UHMW PE; (4) only the heretoforementioned UHMW PE.

These 3.5-pound cylinders were tested as to their ease of ignition. Ease of ignition was determined by whether the prepared cylinder could be ignited with a safety match in a windless environment. As shown in the following table only the cylinders comprising paraffin wax and at least 2.5 weight percent of UHMW PE could pass this ignition test.

TABLE

| Cylinder comprising | Can cylinder be ignited with a safety match? |
|---|---|
| 1) Paraffin wax | No |
| 2) Paraffin wax and 1.0 wt. % PE | No |
| 3) Paraffin wax and 2.5 wt. % PE | Yes |
| 4) Paraffin wax and 5.0 wt. % PE | Yes |
| 5) Paraffin wax and 10.0 wt. % PE | Yes |
| 6) UHMW PE | No |
| 7) Paraffin wax and 5.0 wt. % PE* | No |
| 8) Microcrystalline wax and 5 wt. % PE | No |

*Polyethylene with a molecular weight of 100,000

Other tests showed that it was impossible to ignite the cylinder of paraffin wax (cylinder 1) or the paraffin wax containing the lower molecular weight polyethylene (cylinder 7) even with a torch.

Cylinders 3, 4 and 5 were tested further. These cylinders did not deform when exposed to ambient temperatures of 95° F. and higher. Essentially no smoke was formed during the 2 or more hours of combustion. After combustion only a negligible hydrocarbon residue remained.

Substantially equivalent results as in the above examples are obtained when (1) other paraffin waxes are used and/or (2) other ultra high molecular weight polyethylenes are used.

The invention claimed is:

1. A solid fuel composition comprising paraffin wax having uniformly distributed therein an amount of polyethylene constituting between 1.1 and 25 weight percent of the composition and sufficient to facilitate ignitability, said polyethylene having a weight average molecular weight in the range of 500,000 to 6,000,000.

2. A composition according to claim 1 wherein the wax has a melting point between 127° F. and 156° F.

* * * * *